(12) United States Patent
Kim et al.

(10) Patent No.: US 11,613,611 B2
(45) Date of Patent: Mar. 28, 2023

(54) FILM FOR LAMINATING GLASS, METHOD FOR MANUFACTURING FILM FOR LAMINATING GLASS, AND VEHICLE COMPRISING FILM FOR LAMINATING GLASS

(71) Applicant: SKC Co., Ltd., Suwon-si (KR)

(72) Inventors: Hyejin Kim, Suwon-si (KR); Jiyeon Ryu, Suwon-si (KR); Kyuhun Kim, Seoul (KR); Sungjin Chung, Seoul (KR)

(73) Assignee: SKC Co., Ltd., Suwon-si (KR)

( * ) Notice: Subject to any disclaimer, the term of this patent is extended or adjusted under 35 U.S.C. 154(b) by 86 days.

(21) Appl. No.: 17/106,339

(22) Filed: Nov. 30, 2020

(65) Prior Publication Data
US 2021/0078292 A1   Mar. 18, 2021

Related U.S. Application Data

(63) Continuation of application No. PCT/KR2019/002689, filed on Mar. 8, 2019.

(30) Foreign Application Priority Data

Jun. 5, 2018 (KR) .................. 10-2018-0065123

(51) Int. Cl.
| | |
|---|---|
| *C08J 3/18* | (2006.01) |
| *B32B 17/10* | (2006.01) |
| *B32B 27/22* | (2006.01) |
| *B32B 27/36* | (2006.01) |
| *C08J 5/18* | (2006.01) |
| *C08K 5/00* | (2006.01) |
| *B32B 27/08* | (2006.01) |

(Continued)

(52) U.S. Cl.
CPC .............. *C08J 3/18* (2013.01); *B32B 17/10* (2013.01); *B32B 27/22* (2013.01); *B32B 27/36* (2013.01); *C08J 5/18* (2013.01); *C08K 5/0016* (2013.01); *B32B 2264/10* (2013.01); *B32B 2307/40* (2013.01); *B32B 2315/08* (2013.01); *B32B 2331/00* (2013.01); *B32B 2605/006* (2013.01); *C08J 2329/14* (2013.01)

(58) Field of Classification Search
None
See application file for complete search history.

(56) References Cited

U.S. PATENT DOCUMENTS

| | | |
|---|---|---|
| 7,528,192 B2 | 5/2009 | Papenfuhs et al. |
| 2006/0205871 A1* | 9/2006 | Papenfuhs ............... C08F 8/00 525/61 |

(Continued)

FOREIGN PATENT DOCUMENTS

| | | |
|---|---|---|
| CN | 88 1 01715 A | 10/1988 |
| EP | 0 289 142 A2 | 11/1988 |

(Continued)

OTHER PUBLICATIONS

International Search Report dated Jul. 5, 2019 in counterpart International Patent Application No. PCT/KR2019/002689 (2 pages in English and 2 pages in Korean).

*Primary Examiner* — Ramsey Zacharia
(74) *Attorney, Agent, or Firm* — NSIP Law

(57) ABSTRACT

A film for laminating glass includes a polyvinyl acetal, a plasticizer, inorganic particles, and a trioxane-based compound.

19 Claims, 3 Drawing Sheets

(51) Int. Cl.
- *B32B 7/02* (2019.01)
- *B32B 27/06* (2006.01)
- *B32B 27/18* (2006.01)
- *C08K 3/22* (2006.01)
- *C08K 5/10* (2006.01)

(56) References Cited

U.S. PATENT DOCUMENTS

| | | | |
|---|---|---|---|
| 2012/0164457 A1* | 6/2012 | Fukatani | C08K 5/0016 428/441 |
| 2018/0104934 A1* | 4/2018 | Mori | B32B 17/10357 |

FOREIGN PATENT DOCUMENTS

| | | |
|---|---|---|
| JP | 4-175248 A | 6/1992 |
| JP | 2000-280414 A | 10/2000 |
| JP | 3153904 B2 | 4/2001 |
| JP | 2005-187226 A | 7/2005 |
| JP | 2006-513284 A | 4/2006 |
| JP | 2017-82099 A | 5/2017 |
| KR | 10-0491571 B1 | 5/2005 |
| KR | 10-2006-0130034 A | 12/2006 |
| KR | 10-1066056 B1 | 9/2011 |
| KR | 10-2012-0065332 A | 6/2012 |
| KR | 10-1261204 B1 | 5/2013 |
| WO | WO 2014/017203 A1 | 1/2014 |

* cited by examiner

FILM FOR LAMINATING GLASS, METHOD FOR MANUFACTURING FILM FOR LAMINATING GLASS, AND VEHICLE COMPRISING FILM FOR LAMINATING GLASS

CROSS-REFERENCE TO RELATED APPLICATIONS

This application is a continuation of International Application No. PCT/KR2019/002689 filed on Mar. 8, 2019, which claims the benefit of Korean Patent Application No. 10-2018-0065123 filed on Jun. 5, 2018, in the Korean Intellectual Property Office, the entire disclosures of which are incorporated herein by reference for all purposes.

BACKGROUND

1. Field

The present disclosure relates to film for laminating glass, method for manufacturing film for laminating glass, and vehicle comprising film for laminating glass.

2. Description of the Background

Laminated glass (e.g., tempered glass and safety glass) consisting of a pair of glass panels and a synthetic resin film inserted therebetween is widely used for window glass in road vehicles such as automobiles because of its enhanced safety due to the fact that its fragments are not scattered even when the glass is broken. In some cases, a polyvinyl acetal resin having a high affinity for inorganic materials is utilized in the film applied to such laminated glass.

Infrared rays may be only partially reflected by general glass. This may cause energy loss because the efficiency of a climate control unit is reduced when radiant heat from outdoor solar heat flows inside raising an indoor temperature in summer, and when the infrared rays from an indoor heater unit are emitted outside lowering an indoor temperature in winter.

To address this problem a heat shielding film has been applied to the glass, however, the use of a heat shielding film causes difficulties in controlling visible light transmission or reflectance, and adhesion of the film may be reduced when the glue for bonding the film is exhausted.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a film for laminating glass includes a polyvinyl acetal, a plasticizer, inorganic particles, and a trioxane-based compound.

The inorganic particles and the trioxane-based compound included in the film may have a weight ratio of inorganic particles to trioxane-based compound of 1:0.005 to 0.8.

The trioxane-based compound and the plasticizer may have a difference in refractive index from each other of 0.1 or less.

The trioxane-based compound may have 1,3,5-trioxane skeleton, and 1 to 3 carbon atoms within 3 carbon atoms included in the skeleton may have hydrogen or an alkyl group having 1 to 5 carbon atoms, respectively.

The inorganic particles may include infrared ray blocking particles.

The trioxane-based compound may be a dispersion stabilizer.

The trioxane-based compound may be present in an amount of 1 wt % or less with respect to a total weight of the film for laminating glass.

A difference between values of visible light transmittance and solar transmittance of the film for laminating glass may be 10% or more.

A deviation of visible light transmittance of the film for laminating glass may be 1.0 or less.

A visible light transmittance of the film for laminating glass may be 70% or more.

A deviation of solar transmittance of the film for laminating glass may be 1.0 or less.

A solar transmittance of the film for laminating glass may be 50% or more.

A haze value of the film for laminating glass may be 3.5% or less.

A laminated glass may include a laminate where the film for laminating glass is disposed between two sheets of glass.

A vehicle may include the laminated glass.

In another general aspect, a method for manufacturing a film for laminating glass includes preparing an inorganic particle dispersion by mixing inorganic particles and a composition for dispersion including a trioxane-based compound and a first plasticizer, and mixing and extruding i) a composition for film including a polyvinyl acetal, a second plasticizer and ii) the inorganic particle dispersion, to form the film for laminating glass.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
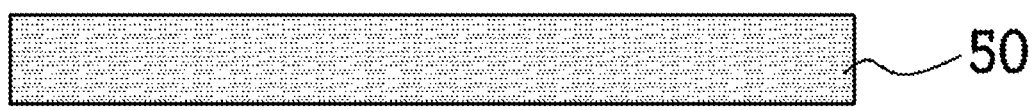
FIGS. 1A, 1B, and 1C show conceptual views illustrating sections of a film for laminating glass, respectively, according to one or more examples.

Hereinafter, while examples of the present disclosure will be described in detail with reference to the accompanying drawings, it is noted that the present disclosure is not limited to the examples presented.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

In the present specification, the term "combination thereof" include in Markush type description means mixtures or combinations of one or more elements described in Markush type and thereby means that the disclosure includes one or more elements selected from the Markush group.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

The object of the present disclosure is to provide a film for laminating glass having excellent heat shielding performance and optical properties, a method for manufacturing the same and a vehicle including the same.

In the present specification, weight average molecule quantity or number average molecule quantity is expressed in units of Dalton (Da) while omitting Dalton (Da). The weight average molecule quantity and so on are described based on the values measured using GPC (gel permeation chromatography)—ELSD (Evaporative Light Scattering Detector), however the measuring method is not limited thereto.

Arts for adding heat shielding performance to laminated glass are used for blocking a part of infrared rays which raise the indoor temperature of automobiles or architecture. The heat shielding performance derived from the method of dispersing inorganic particles inside the film is added to the film and the laminated glass applied with the film. In case of applying materials with a high affinity for inorganic particles having heat shielding effect for the film for laminating glass as hydrophilic dispersion stabilizers, the dispersion of particles may be easily broken when mixed with a plasticizer. And these materials must satisfy demanding conditions such as not to impair the adhesiveness and transparency of the film.

Trioxane-based compounds according to one or more examples as described herein, were discovered to provide an effective dispersion stabilizer while satisfying the above described demanding conditions.

Figure 1B:
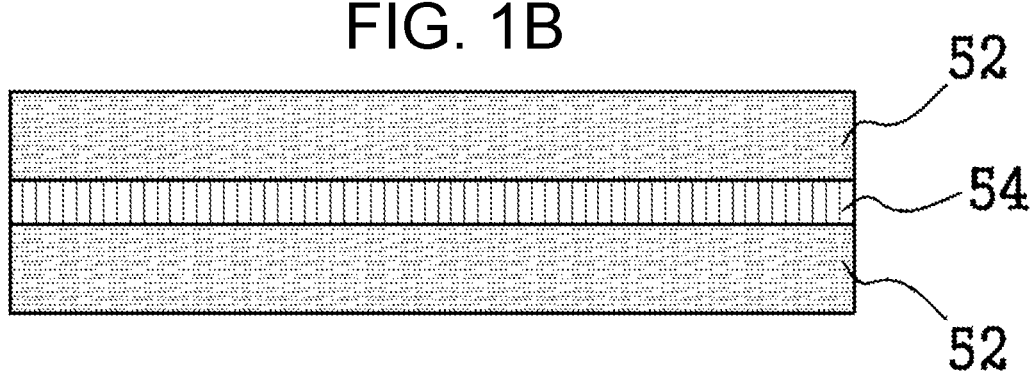
Figure 1C:
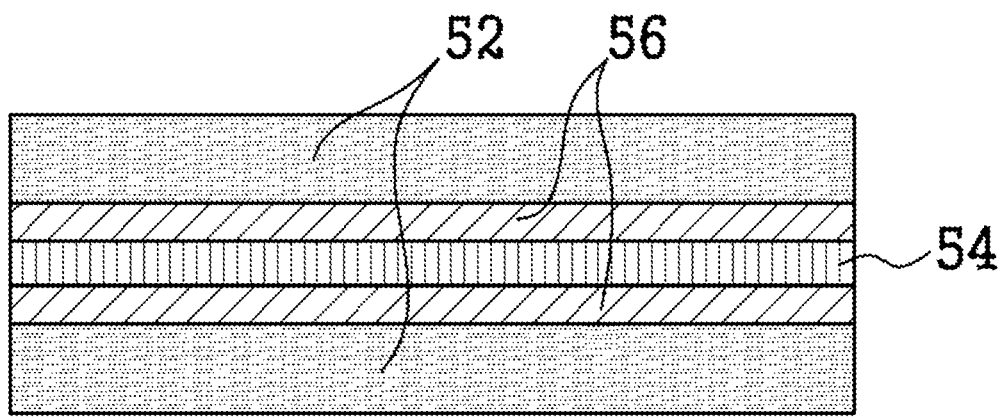
Figure 4:
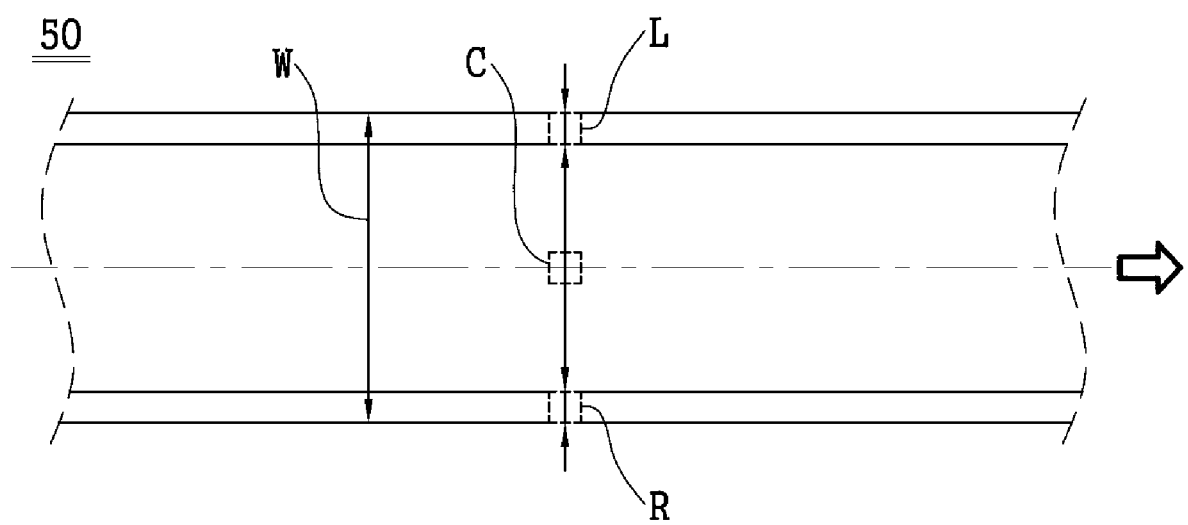
FIG. 4 is a drawing illustrating the location for collecting samples when visible light transmittance or solar transmittance by area in one or more examples is measured.

Conceptual views such as FIGS. 1A, 1B, and 1C show sections of a film for laminating glass, respectively, according to one or more examples. FIG. 4 shows the location for collecting samples when visible light transmittance or solar transmittance by area in one or more examples is measured.

A film for laminating glass 50 according to one or more examples of the disclosure will now be described in detail with reference to the drawings.

In one general aspect, the film for laminating glass 50 includes a polyvinyl acetal, a plasticizer, an inorganic particle, and a trioxane-based compound.

Dispersion stabilizers such as methoxy propyl acetate and methyl ethyl ketone applied to dispersion of inorganic particles have good quality to disperse inorganic particles, however, they cause problems such as breaking dispersion stabilization in processes of film manufacturing because these stabilizers have low quality of dispersion with the plasticizer applied to the film for laminating glass. Low quality of dispersion can adversely affect material properties of the film for laminating glass, such as causing the occurrence of substantial haze on the film itself and/or causing large differences in optical properties by location (an area within the film) of the film for laminating glass.

As described herein a trioxane-based compound is applied as a dispersion stabilizer to solve these problems. Trioxane-based compounds in the form of an organic solvent having both hydrophilic and hydrophobic properties function as the dispersion stabilizer which improves dispersion stability of heat shielding particles (inorganic particles), generate even infrared ray blocking effects over the entire film for laminating glass, and simultaneously do not impair inherent material properties of the film such as optical properties, but rather can improve them.

The inorganic particles for blocking infrared rays may include one selected from the group consisting of indium tin oxide (ITO) inorganic particles, cesium tungsten oxide (CWO) inorganic particles, antimony tin oxide (ATO) inorganic particles, and combinations thereof, but not limited thereto. For example, one from the above group may be doping treated, coating treated, and the like or combinations thereof.

The inorganic particles may be comprised in an amount of 0.001 to 2 wt %, or 0.01 to 0.8 wt % with respect to a total weight of the film for laminating glass. In this case, the optical properties of the film are maintained and blocking effect to infrared rays in a suitable range is induced.

The inorganic particles applied to the film for laminating glass 50 may be a mixture of ITO inorganic particles and CWO inorganic particles, for example, the inorganic particles may be a mixture present in a weight ratio of ITO inorganic particles to CWO inorganic particles of 1:0.05 to 4, for example, 1:0.25 to 0.4. In case of applying a mixture of two or more inorganic particles like above, infrared rays in a wider wavelength range can be blocked effectively.

The inorganic particles and the trioxane-based compounds may be comprised in the film in a weight ratio of inorganic particles to trioxane-based compounds of 1:0.005 to 0.8. Specifically, the inorganic particles and the trioxane-based compounds may be comprised in the film in a weight ratio of 1:0.005 to 0.6, or 1:01 to 0.45. The trioxane-based compounds mixed with the inorganic particles in the weight ratio as above disperse the inorganic particles stably and evenly inside the plasticizer and the polyvinyl acetal. The trioxane-based compounds mixed with the inorganic particles in the weight ratio as above has excellent effect when used in even a trace amount and simultaneously does not impair optical properties of the plasticized polyvinyl acetal film.

In case of applying a trioxane-based compound in an amount of less than 0.005 with respect to 1 part by weight of the inorganic particles, dispersion stabilization effect may be insignificant. In case of applying a trioxane-based compound in an amount of more than 0.8 with respect to 1 part by weight of the inorganic particles, the degree of dispersion stabilization effect rise may be insignificant.

The trioxane-based compound and the plasticizer may have a difference of refractive indexes in the range of 0.1 or less, specifically 0.005 or less, more specifically 0.001 to 0.05. Applying the dispersion stabilizers having a small difference of refractive index from the plasticizer as above, can minimize the change of optical properties of the film for laminating glass that can result from applying dispersion stabilizers, thus in this case the film for laminating glass further enhanced in optical properties can be manufactured.

The trioxane-based compound and the polyvinyl acetal may have a difference of refractive indexes in the range of 0.1 or less, specifically 0.001 or less. Applying the trioxane-based compound having a small difference of refractive index from the polyvinyl acetal as above, can minimize the change of optical properties of the film for laminating glass that can result from applying the additional dispersion stabilizers, thus in this case the film for laminating glass having more even dispersion of inorganic particles can be manufactured.

The trioxane-based compound may function as dispersion stabilizer.

The trioxane-based compound may be, specifically applied with one or more types among a trioxane-based compound having 1,3,5-trioxane skeleton, a trioxane-based compound having 1,2,4-trioxane skeleton, and a trioxane-based compound having 1,2,3-trioxane skeleton.

The trioxane-based compound specifically may have the 1,3,5-trioxane skeleton and 1 to 3 carbon atoms within 3 carbon atoms included in the skeleton may independently have hydrogen or alkyl group having 1 to 5 carbon atoms, respectively, having structure of Formula 1 as follows.

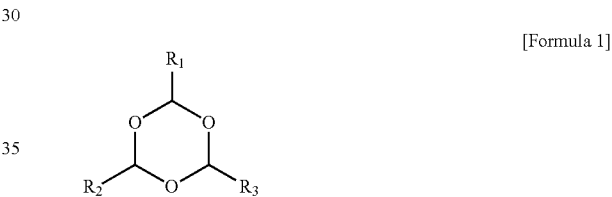

[Formula 1]

In the Formula 1, the R1, R2, and R3 are independently hydrogen or alkyl group having 1 to 5 carbon atoms, respectively.

Specifically, the R1, R2, and R3 are independently hydrogen or alkyl group having 1 to 5 carbon atoms, respectively, except the case in which all the R1, R2, and R3 are hydrogen.

The trioxane-based compound may be trialkyl trioxane, and may be specifically any one selected from the group consisting of 2,4,6-trimethyl-1,3,5-trioxane, 2,4,6-triethyl-1,3,5-trioxane, 2,4,6-tri(n-propyl)-1,3,5-trioxane, 2,4,6-tri(iso-propyl)-1,3,5-trioxane, 2,4,6-tri(n-butyl)-1,3,5-trioxane, 2,4,6-tri(sec-butyl)-1,3,5-trioxane, 2,4,6-tri(isobutyl)-1,3,5-trioxane, 2,4,6-tri(tert-butyl)-1,3,5-trioxane, 2,4,6-tripentyl-1,3,5-trioxane, and combinations thereof.

Applying the trialkyl trioxane as the trioxane-based compound helps relatively even dispersion of inorganic particles in an entire resin, simultaneously it maintains excellent compatibility with both the polyvinyl acetal and the plasticizer.

The trialkyl trioxane may be tripropyl trioxane, and may be specifically any one selected from the group consisting of 2,4,6-tri(n-propyl)-1,3,5-trioxane, 2,4,6-tri(iso-propyl)-1,3,5-trioxane, and combinations thereof.

Applying the tripropyl trioxane as the trioxane-based compound enables the film for laminating glass to have an infrared ray blocking effect which is entirely even, and enhanced optical properties because it disperses inorganic particles well inside the polyvinyl acetal and the plasticizer, maintaining the condition well. These properties may come from the fact the tripropyl trioxane has a polarity between the polyvinyl acetal and the plasticizer that have different polarities.

The trioxane-based compounds may be comprised in an amount of 0.0001 to 1 wt %, 0.0001 to 0.5 wt %, or 0.001 to 0.1 wt % with respect to a total weight of the film for laminating glass.

The trioxane-based compound has excellent effect in enhancing dispersion stability of inorganic particles even when applied in a trace amount, and does not impair optical properties of the film for laminating glass but rather disperses inorganic particles evenly inside the entire film to enhance optical properties of the film.

The plasticizers may be applied to the film in two ways, a first plasticizer to disperse the inorganic particles and a second plasticizer mixed with the polyvinyl acetal resin. The first plasticizer and the second plasticizer may be the same material when applied to the film.

Specifically, the plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibu Oxyethoxyethyl adipate (DBEA), butyl carbitol adipate (DBEEA), dibutyl sebacate (DBS), bis 2-hexyl adipate (DHA) and mixtures thereof, for example, triethylene glycol bis 2-ethylhexanoate (3G8, refractive index 1.44) may be applied as the plasticizer.

The plasticizer may be comprised in the film in an amount of 21 to 27 wt % with respect to a total weight of the film for laminating glass 50, and in this case mechanical strength of the manufactured polyvinyl acetal film may be more excellent.

The plasticizer may be comprised in the film in an amount of 29 to 42 wt % with respect to a total weight of the film for laminating glass 50, and in this case the manufactured polyvinyl acetal film may function as a core layer having sound insulation performance.

The polyvinyl acetal may be obtained from acetalization of the polyvinyl acetal having a polymerization degree of 1,600 to 3,000 with aldehyde. The aldehyde is not particularly limited. For example, it may be selected from the group consisting of n-butyl aldehyde, isobutyl aldehyde, n-valeral aldehyde, 2-ethyl butyl aldehyde, n-hexyl aldehyde, and blended resins thereof. Specifically, the resin manufactured using n-butyl aldehyde is good in that the resin has a small difference in refractive index to glass and excellent adhesion with glass.

The polyvinyl acetal may be a first polyvinyl acetal which contains hydroxyl group in an amount of 30 mol % or more, and acetyl group in an amount of 5 mol % or less. The first polyvinyl acetal may contain hydroxyl group in an amount of 30 to 50 mol %. Applying the polyvinyl acetal having these characteristics enables manufacture of the polyvinyl acetal film having excellent mechanical strength and adhesion with glass.

The polyvinyl acetal may be a second polyvinyl acetal which contains hydroxyl group in an amount of 40 mol % or less, and acetyl group in an amount of 8 mol % or less. The second polyvinyl acetal may contain hydroxyl group in an amount of 1 to 30 mol %. Applying the polyvinyl acetal having these characteristics enables manufacture of the polyvinyl acetal film having sound insulation performance.

The film for laminating glass 50 may comprise the polyvinyl acetal in an amount of 57 to 70 wt % with respect to a total weight of the film for laminating glass, and manufactured in this case the polyvinyl acetal film may function as a core layer having sound insulation performance.

The film for laminating glass 50 may further contain an additive selected from the group consisting of an antioxidant, a heat stabilizer, a UV absorber, a UV stabilizer, a glass adhesion regulator, and combinations thereof. Due to inclusion of the additive, long-term durability such as thermal stability and light stability and anti-scattering performance of the film can be enhanced.

As the antioxidant, a hindered amine-based antioxidant or a hindered phenol-based antioxidant may be used. Specifically, on the process of manufacturing polyvinyl butyral (PVB) which needs a processing temperature of 150° C. or higher, a hindered phenol-based antioxidant may be used. The hindered phenol-based antioxidant, for example, may be Irganox 1976, 1010 or the like, manufactured by BASF SE.

As the heat stabilizer a phosphite-based heat stabilizer may be used considering suitability with an antioxidant. The heat stabilizer, for example, may be Irgafos 168 manufactured by BASF SE.

As the UV absorber, Chemisorb 12, Chemisorb 79, Chemisorb 74, or Chemisorb 102 manufactured by CHEMIPRO KASEI KAISHA, LTD or Tinuvin 328, Tinuvin 329, or Tinuvin 326 manufactured by BASF SE may be used. As the UV stabilizer, Tinuvin manufactured by BASF SE may be used. As the glass adhesion regulator, a salt of a metal such as magnesium (Mg), potassium (K), sodium (Na), epoxy-based modified silicon (Si) oil, or a mixture thereof may be used, but the present disclosure is not limited thereto.

The additives may be comprised in an amount of 0 to 1 wt %, or 0.01 to 1 wt % with respect to a total weight of the film for laminating glass.

The film for laminating glass 50 may have a difference of 10% or more between values of visible light transmittance and solar transmittance.

The film for laminating glass 50 with a trioxane-based compound applied can have more even and stabilized dispersion of inorganic particles inside polyvinyl acetal thus giving a more even and excellent heat shielding performance to a plasticized polyvinyl acetal film and simultaneously maintaining optical properties when compared to a film which does not have heat shielding performance.

The film for laminating glass 50 may have a difference of 15% or more, or 15 to 20% between values of visible light transmittance and solar transmittance. The difference between values of visible light transmittance and solar transmittance (difference value of average transmittance) is based on the value obtained by subtracting the value of average solar transmittance from the value of average visible light transmittance. Average visible light transmittance and average solar transmittance are described further below.

The film for laminating glass 50 may have a visible light transmittance deviation of 1.0 or less. Specifically, the visible light transmittance deviation may be 0.5 or less, 0.0001 to 0.2, or 0.001 to 0.01. When the inorganic particles that are additives for adding heat shielding performance are not dispersed evenly and stably, the deviation by area of visible light transmittance of the film for laminating glass may increase.

Specifically, the visible light transmittance deviation may be 1.0 or less when measured by obtaining samples from areas L and R located within 10% of the width (width direction, W) of the film for laminating glass 50 toward the center from both ends, and the area C located at the center, respectively (FIG. 4). The visible light transmittance deviation of 1.0 or less when measured as described means that the visible light transmittance of the film for laminating glass 50 is obtained evenly in the entire film, comparatively.

The film for laminating glass 50 may have a visible light transmittance of 70% or more, 80% or more, or even 80 to 99%. The visible light transmittance having a value in the range defined above means the value of average visible light transmittance measured from at least three parts L, R, and C (referred to above) of the film for laminating glass 50.

The film for laminating glass 50 may have a solar transmittance deviation of 1.0 or less. Specifically, the film for laminating glass 50 may have a solar transmittance deviation of 0.001 to 0.08. When the inorganic particles are not dispersed evenly and stably, the solar transmittance deviation by part of the film for laminating glass 50 may increase.

Specifically, the solar transmittance deviation may be 1.0 or less when measured by obtaining samples from the areas L and R located within 10% of the width (width direction, W) of the film for laminating glass 50 toward the center from both ends, and the area C located at the center, respectively (FIG. 4). The solar transmittance deviation of 1.0 or less when measured as described means that even solar transmittance of the film for laminating glass 50 is obtained in the entire film, comparatively.

The film for laminating glass 50 may have a solar transmittance of 50% or more, 50 to 75%, or even 55 to 70%. When the solar transmittance has a value of the range defined above, the heat shielding performance of the film for laminating glass 50 is enhanced. The solar transmittance having a value of the range defined above means the value of average solar transmittance measured from at least three parts L, R, and C (referred to above) of the film for laminating glass 50.

The film for laminating glass 50 may have a haze value (%) of 3.5 or less, 3 or less, 2 or less, 1.2 or less, or 0.1 to 0.8. These low haze values mean that optical properties of the film for laminating glass are excellent. The film comprising inorganic particles to obtain sufficient solar blocking effect may have degraded optical properties and an increased haze value caused from low dispersion of inorganic particles. The present disclosure has solved these problems by applying trioxane-based compounds and can provide a film for laminating glass having excellent optical properties to substantially the same degree of a film with no inorganic particles applied.

The film for laminating glass 50 may be a monolayer structure (one layer) (FIG. 1A), or a multilayer structure with two layers or more. When the film for laminating glass 50 is a multilayer structure, the inorganic particles and the trioxane-based compounds may be applied to only some of the layers or to the entire multilayer structure.

When the film for laminating glass 50 is a multilayer structure, specifically in a case of having three layers, the layers may be arranged in first layer 52-second layer 54-first layer 52 structure (FIG. 1B), in another case of having five layers, the layers may be arranged in first layer 52-third layer 56-second layer 54-third layer 56-first layer 52 structure (FIG. 1C). When the inorganic particles and the trioxane-based compounds are applied to some of the layers of the film for laminating glass 50, the basis of the content referred in the present specification, that is "from the entire film", is construed as an entire composition of the corresponding layer.

The first layer 52 may comprise the polyvinyl acetal (the first polyvinyl acetal) in an amount of 58 to 80 wt % and the plasticizer in an amount of 20 to 42 wt %.

The first layer 52 may comprise the polyvinyl acetal (the first polyvinyl acetal) in an amount of 60 to 75% and the plasticizer in an amount of 25 to 40 wt %. In this case the first layer 52 may function as a skin layer, and not only have excellent adhesion with transparent laminates such as glass but also give excellent mechanical strength to the laminated glass.

The second layer 54 is placed on the first layer and may comprise the polyvinyl acetal (the second polyvinyl acetal) and a plasticizer.

The second layer 54 may comprise the polyvinyl acetal (the second polyvinyl acetal) in an amount of 58 to 69 wt % and the plasticizer in an amount of 31 to 42 wt %.

The second layer may function as a sound insulating layer, and an interlayer including the second layer 54 may have excellent mechanical strength and sound insulation performance.

The second polyvinyl acetal may have a value of weight average molecular quantity of 400,000 or more, of 490,000 to 850,000, of 610,000 to 820,000, or of 690,000 to 790,000. When a value of weight average molecular quantity of the second polyvinyl acetal is 490,000 or more, mechanical strength of the interlayer may be enhanced, and co-extrusion workability and miscibility of the composition may be further enhanced.

The film for laminating glass 50 may further comprise a third layer 56 which is placed between the first layer 52 and the second layer 54. The third layer 56 may comprise a polyvinyl acetal (the third polyvinyl acetal) and a plasticizer.

The third layer 56 may comprise the polyvinyl acetal (the third polyvinyl acetal) in an amount of 58 to 80 wt % and the plasticizer in an amount of 20 to 42 wt %.

The first polyvinyl acetal and the third polyvinyl acetal may be the same or different each other.

The hydroxyl group quantity of the third polyvinyl acetal may be a value between the hydroxyl group quantity of the first polyvinyl acetal and the second polyvinyl acetal.

When the film for laminating glass 50 is a five layer structure, excellent sound insulation performance in a wider temperature range may be obtained, and heterogeneity of layers which is decreased may decrease interlayer delamination phenomenon remarkably.

The film for laminating glass 50 may have a total thickness of 0.4 mm (millimeters) or more, specifically 0.4 to 1.6 mm, or 0.5 to 1.2 mm. The range of thickness is suitable considering meeting performance requirements while minimizing cost. The film for laminating glass may consist of the first layer 52.

When the film for laminating glass 50 is a multilayer structure, a thickness of the first layer 52 may be 0.15 to 0.4 mm, respectively.

When the film for laminating glass 50 comprises both the first layer 52 and the second layer 54, a thickness of the second layer 54 may be 0.04 to 0.20 mm, 0.07 to 0.18 mm, or 0.09 to 0.15 mm.

When the film for laminating glass 50 comprises all the first layer 52, the second layer 54 and the third layer 56, a thickness of the third layer 56 may be 0.1 mm or less, 0.001 to 0.1 mm, or 0.001 to 0.08 mm.

In another general aspect, a method for manufacturing the film for laminating glass includes the steps of preparing an inorganic particle dispersion by mixing inorganic particles and a composition for dispersions comprising a trioxane-based compound and a first plasticizer (preparation step); and mixing and extruding i) a composition for film comprising a polyvinyl acetal, a second plasticizer and ii) the inorganic particle dispersion, to form the film for laminating glass (extrusion step).

The preparation step is a process of preparing inorganic particles in the form of a dispersion using the composition for dispersions so that inorganic particles and a polyvinyl acetal resin are mixed well. Thus, in this step an inorganic particle dispersion is prepared including an inorganic particle, a trioxane-based compound, and a plasticizer (a first plasticizer).

The descriptions about a type of the inorganic particles, a type of the trioxane-based compound, and a content each thereof are provided already in the above thus further description will be omitted.

The extrusion step is a process for mixing a composition for the film including a polyvinyl acetal and a plasticizer (a second plasticizer) with the inorganic particles, extruding and making the composition to form the film for laminating glass. Specifically, the film may be manufactured by the method of co-extrusion, in the below case of manufacturing a multilayer structured film, the film may be manufactured through processes where compositions having different components are combined in a feed block and formed in a multilayer structure.

The descriptions about the specific type, content, applicable extra additives and so on are provided already in the above thus further description will be omitted.

The film for laminating glass having excellent solar blocking performance and a low haze value may be manufactured by the method of mixing inorganic particles with polyvinyl acetals after applying inorganic particles that may have low compatibility with polyvinyl acetals in the form of an inorganic particle dispersion comprising a trioxane-based compound and a plasticizer.

Figure 2:
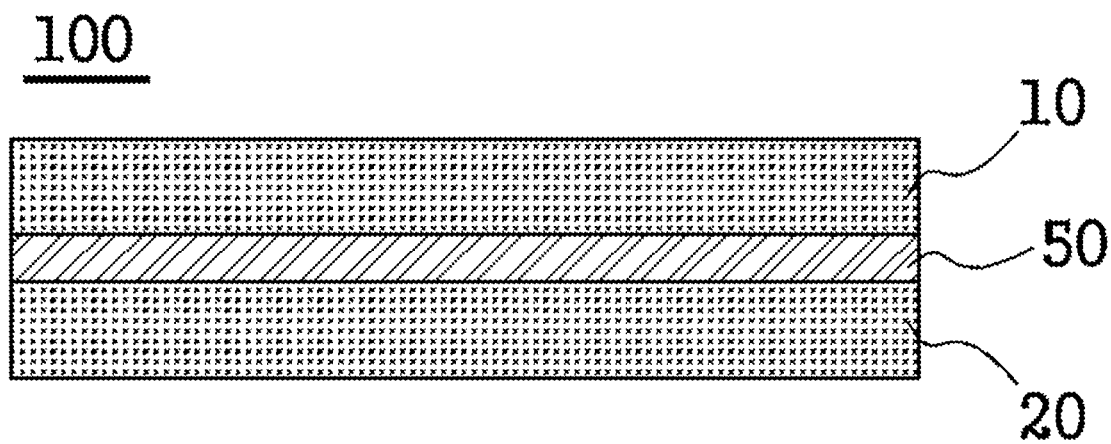
FIG. 2 is a conceptual view illustrating a section of laminated glass according to one or more examples.

FIG. 2 is a conceptual view showing a section of laminated glass 100 according to one or more examples. Referring to FIG. 2, the laminated glass 100 according to an example of the disclosure as described herein, comprises a laminate in which the film for laminating glass 50 according to examples of the disclosure is disposed between two sheets of glass 10, 20.

The two sheets of glass 10, 20 may be the same or different in type and thickness. The material corresponding to glass is not limited to glass and includes different materials such as plastic if it can be used as a light transmission laminate.

The description about the film for laminating glass 50 is provided already in the above thus further description will be omitted.

The laminated glass 100 may be applied in the processes of pre-laminating and main laminating in the field of the present arts, and the specific method thereof is not particularly limited.

Figure 3:
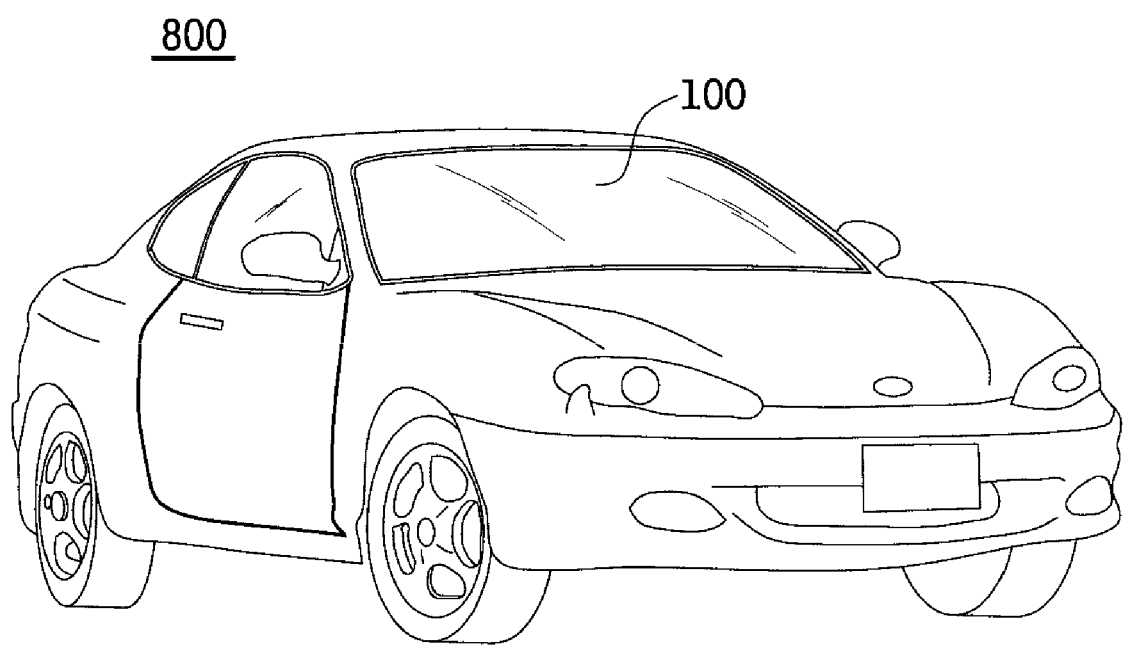
FIG. 3 is a drawing showing an example of laminated glass applied to a windshield in an automobile which is an example of a vehicle according to one or more examples.

FIG. 3 is a drawing showing an automobile which is an example of a vehicle and laminated glass applied as a windshield according to one or more examples of the disclosure. Referring to the drawing, a description will be provided about vehicle 800 that is another embodiment of the disclosure. The vehicle 800 comprises the laminated glass described above. Specifically, the vehicle 800 comprises the laminated glass as a windshield.

The windshield is equipped for shielding winds from outside so that the driver can see the outside with the naked eye, and the windshield may include the laminated glass 100 described above.

The vehicle 800 includes a body forming the body of the vehicle, a driver attached to the body (engine, etc.), a drive wheel attached to be rotatable to the body, a connector connecting the drive wheel and the driver; and a windshield attached to a part of the body, which is a light transmission laminate shielding wind from outside.

The vehicle 800 may be applied to vehicles applied with a windshield, representatively the vehicle 800 may be an automobile, and the body, the driver, the drive wheel, and the connector may be applied without limit if they are units generally applied to an automobile.

The automobile that is an example of the vehicle 800 may be applied with the laminated glass 100 as a windshield, give excellent heat shielding effect to the automobile and excellent light transmission performance, impact resistance, and penetration resistance to the entire area of laminated glass 100 maintained in a certain level or higher.

Example embodiments will be described in more detail below. Hereinafter, content or % sign means parts by weight or wt % except in the case where the context clearly has a different meaning.

Manufacture of a Film for Laminating Glass

1) Manufacture of a Polyvinyl Acetal Resin

Polyvinyl alcohol having an average polymerization degree of 1700 and a saponification degree of 99% was mixed with n-butyl aldehyde, thereby obtaining a polyvinyl butyral resin having butyral group of 54.5 mol % and hydroxyl group of 44.7 mol %.

2) Preparation of an Additive Mixture

Irganox 1010 and Irgafos 168 in an amount of 0.1 parts by weight respectively, Tinuvin P in an amount of 0.3 parts by weight, potassium acetate (K ac) in an amount of 0.022 parts by weight and magnesium acetate (Mg Ac) in an amount of 0.028 parts by weight were mixed, thereby preparing an additive mixture in an amount of 0.55 parts by weight.

3) Manufacture of an Inorganic Particle Dispersion

IR (Infrared ray) blocking particulate mixture (ITO+CWO) in an amount of 4.5 parts by weight, tripropyl trioxane (2,4,6-Tripropyl-1,3,5-trioxane, refractive index 1.42) as a dispersion stabilizer, methyl ethyl ketone (MEK) or methoxy propyl acetate in amount of 2 parts of weight, and a plasticizer (Triethylene glycol 2-ethyl hexanoate, 3G8, refractive index: 1.44) in amount of 93.5 parts by weight were mixed, thereby an inorganic particle dispersion in an amount of 100 parts by weight was manufactured. The average particle size inside the dispersion is shown in Table 1 below with the composition. Blue ITO and CWO manufactured by KEELING & WALKER LTD were applied as ITO and CWO, respectively.

TABLE 1

| Dispersion No. | ITO Particulate | | CWO Particulate | | Dispersion Stabilizer 1 Tripropyl Trioxane | Dispersion Stabilizer 2 Methoxy Propyl Acetate (PMA) | Dispersion Stabilizer 3 Methyl Ethyl Ketone (MEK) | Plasticizer 3G8 |
|---|---|---|---|---|---|---|---|---|
| | Average Particle Size* (nm) | Content (Parts by Weight) | Average Particle Size* (nm) | Content (Parts by Weight) | | | | |
| A | 30 | 3.5 | 34 | 1 | 2 | — | — | 93.5 |
| B | 31 | 3.5 | 35 | 1 | — | 2 | — | 93.5 |
| C | 30 | 3.5 | 35 | 1 | — | — | 2 | 93.5 |

TABLE 1-continued

| | ITO Particulate | | CWO Particulate | | Dispersion Stabilizer 1 Tripropyl Trioxane | Dispersion Stabilizer 2 Methoxy Propyl Acetate (PMA) | Dispersion Stabilizer 3 Methyl Ethyl Ketone (MEK) | Plasticizer 3G8 |
|---|---|---|---|---|---|---|---|---|
| Dispersion No. | Average Particle Size* (nm) | Content (Parts by Weight) | Average Particle Size* (nm) | Content (Parts by Weight) | | | | |
| D | 29 | 3.25 | 36 | 1.25 | 2 | — | — | 93.5 |
| E | 30 | 3.25 | 35 | 1.25 | — | 2 | — | 93.5 |
| F | 30 | 3.25 | 34 | 1.25 | — | — | 2 | 93.5 |

*Dispersed particulate size is shown by measured size of heat shielding particulates dispersed inside the inorganic particle dispersion. The dynamic light scattering system manufactured by MICROTRAC BEL is used as a measuring device and an average particle size is shown in the D50 value corresponding 50% of the highest value in the cumulative distribution.

4) Manufacture of a Film for Laminating Glass (Manufacture of a film in Example 1) The mixture of polyvinyl butyral resin and the additive prepared above were thrown into a powder feeder, and the solution prepared by mixing a 3G8 plasticizer in an amount of 23.26 parts by weight with an inorganic particle dispersion A in an amount of 4 parts by weight and dispersed by stirring enough with a blender for 60 minutes and then thrown into a liquid feeder.

The solution was extruded with a twin screw extruder and formed into a film through a T-die. Through these processes the film with a width of 1.2 m width and a thickness of 760 μm (microns) according to embodiments was manufactured. Cutting 0.1 m from both ends of the film manufactured according to embodiments and winding the final film with a width of 1 m on a roll were performed, thereby obtaining the sample of an example embodiment.

(Manufacture of a film in Comparative Example 1) Comparative Example 1 was manufactured in the same manner as in Example 1 except using inorganic particle dispersion B.

(Manufacture of a film in Comparative Example 2) Comparative Example 2 was manufactured in the same manner as in Example 1 except using inorganic particle dispersion C.

(Manufacture of a film in Example 2) Example 2 was manufactured in the same manner as in Example 1 except using inorganic particle dispersion D (Manufacture of a film in Comparative Example 3) Comparative Example 3 was manufactured in the same manner as in Example 1 except using inorganic particle dispersion E.

(Manufacture of a film in Comparative Example 4) Comparative Example 4 was manufactured in the same manner as in Example 1 except using inorganic particle dispersion F.

The composition of each film is arranged in Table 2 below.

TABLE 2

| Number | Type of Inorganic Particle Dispersion | Inorganic Particle Dispersion (Parts by Weight) | Extra Plasticizer (Parts by Weight) | Additive (Parts by Weight) | PVB Resin (Parts by Weight) |
|---|---|---|---|---|---|
| Example 1 | A | 4 | 23.26 | 0.55 | 72.19 |
| Comparative Example 1 | B | 4 | 23.26 | 0.55 | 72.19 |
| Comparative Example 2 | C | 4 | 23.26 | 0.55 | 72.19 |
| Example 2 | D | 4 | 23.26 | 0.55 | 72.19 |
| Comparative Example 3 | E | 4 | 23.26 | 0.55 | 72.19 |
| Comparative Example 4 | F | 4 | 23.26 | 0.55 | 72.19 |

Property Evaluation of the Film for Laminating Glass

1) Measurement of Visible Light Transmittance (Tv) and Solar Transmittance (Ts)

The transmittance was measured after samples by area were obtained by the below method for measurement of visible light transmittance deviation by part.

After designating the area within 10% of the width from both ends of the entire film (width direction) as R and L respectively, and the center of the film as C, cutting film of each area to 10 cm*10 cm (width direction (TD)*length direction (MD)) was carried out. Overlapping PET film coated with silicon in both sides to the areas of cut film, laminating in a vacuum laminator at 150° C. for 10 minutes and eliminating unevenness (pattern) on the surface were also carried out, to make the samples of PVB film having smooth surface.

The spectral transmittance of the center of the film made as above, ranging from 250 nm (nanometers) to 2500 nm was measured at 1 nm intervals using measuring device of spectral transmittance manufactured by JASCO CORPORATION. Visible light transmittance values (Tv) calculated with above data in accordance with KS A 0066 standard, and solar transmittance values (Ts) calculated by parts R/C/L in accordance with KS L 2514 are arranged in Table 3. The average transmittance that was the average value of three parts (L, C and R) calculated by Equation (1) below was also shown in Table 3.

$$\text{Average Transmittance} = (L+C+R)/3 \qquad \text{Equation (1):}$$

2) Average Transmittance Difference Value, Transmittance Deviation, Etc.

The transmittance difference value that was the difference of average visible light transmittance and average solar transmittance was calculated by Equation (2) [(Tv_Average)−(Ts_Average)] below and shown in Table 4 below.

$$\text{Transmittance Difference Value} = \text{Average Visible Light Transmittance} - \text{Average Solar Transmittance} \qquad \text{Equation (2):}$$

Transmittance deviation that was the deviation (absolute value) of transmittance by each part and average transmittance, was calculated by Equation (3) below and the result is shown in Table 4.

$$[|(L-\text{Average Transmittance})|+|(C-\text{Average Transmittance})|+|(R-\text{Average Transmittance})|]/3 \qquad \text{Equation (3):}$$

3) Haze

Haze value was measured using NDH 5000W model manufactured by NIPPON DENSHOKU CO., LTD in accordance with JIS K 7105 standard with the film used in the visible transmittance measurement. The haze value that was the average value measured by parts R/C/L is shown in Table 4 below.

4) Pummel Adhesion Test

The adhesion between a polyvinyl acetal film and glass was evaluated by pummel adhesion test. Specifically, after pre-laminating of a laminate having laminated structure of 2.1 cm glass-film-2.1 cm glass in 300 mm×300 mm for 20 seconds in a vacuum laminator under the conditions of 150° C. and 1 atmospheric pressure, main laminating was performed in an autoclave under the condition of temperature raising time ranging from room temperature to 140° C. for 25 minutes, and maintaining time at 140° C. for 25 minutes.

Cooling to 20° C. for 4 hours, and successive hitting with hammer was performed to the specimen made in the form of laminated glass, and the degree of glass content remaining in the film was measured. Depending on the glass content remaining in the film, a value from 0 to 10 was set as 0 if all glass was removed, and as 10 if all glass remained in the film.

The glass sides were laminated as Tin-Tin side and Air-Air side respectively, valued depending on the above evaluation method and evaluated as Pass if the pummel value was from 3 to 5, or as Fail if not and the result thereof is shown in Table 4 below.

Example 4 applied with the same inorganic particles. In particular, the result of Example 2 shows that further lowered solar transmittance value was enabled compared to Example 1. Simultaneously, in terms of the transmittance deviation value, the dispersion stabilizer of Example 2 was evaluated as bringing remarkably excellent effect to enhancing the dispersion stability compared to the dispersion stabilizers of Comparative Example 3 and Comparative Example 4.

According to the examples described herein, to the film for laminating glass, a method for manufacturing the same, and a vehicle including the same in the present disclosure, a trioxane-based compound having both hydrophilic and hydrophobic properties is applied, with an inorganic particle as a heat shielding particle. The trioxane-based compound and inorganic particle applied as described in the examples disclosed herein, further enhances the degree of dispersion of inorganic particles in a composition, simultaneously does not impair inherent material properties of the film to provide the film for laminating glass having both excellent heat shielding performance and optical properties.

TABLE 3

| Number | Visible Light Transmittance (Tv, %) | | | | Solar Transmittance (Ts, %) | | | |
|---|---|---|---|---|---|---|---|---|
| | L | C | R | Tv_Average | L | C | R | Ts_Average |
| Example 1 | 87.6 | 87.8 | 87.8 | 87.73 | 71.8 | 71.9 | 72 | 71.90 |
| Comparative Example 1 | 84.4 | 89.1 | 71.5 | 81.67 | 73.3 | 82.8 | 61.9 | 72.67 |
| Comparative Example 2 | 69.4 | 56.7 | 53.9 | 60.00 | 62.2 | 54.3 | 52.1 | 56.20 |
| Example 2 | 86.6 | 86.6 | 86.5 | 86.57 | 69.2 | 69.1 | 69.1 | 69.13 |
| Comparative Example 3 | 80.6 | 83.6 | 82.2 | 82.13 | 70 | 65.2 | 71.9 | 69.03 |
| Comparative Example 4 | 59.8 | 57.3 | 55.8 | 57.63 | 54.4 | 50.7 | 51.5 | 52.20 |

TABLE 4

| Number | Mixing Ratio of IR Particles* | Content of IR Particles* | Content of Dispersion Stabilizer* | Deviation of Transmittance | | Haze (%) | Adhesion (Pummel) |
|---|---|---|---|---|---|---|---|
| | | | | Tv | Ts | | |
| Example 1 | 3.5:1 | 0.18 | 0.08 | 0.089 | 0.067 | 0.5 | Pass |
| Comparative Example 1 | 3.5:1 | 0.18 | 0.08 | 6.778 | 7.178 | 4 | Pass |
| Comparative Example 2 | 3.5:1 | 0.18 | 0.08 | 6.267 | 4 | 11 | Fail |
| Example 2 | 3.25:1.25 | 0.18 | 0.08 | 0.044 | 0.044 | 0.7 | Pass |
| Comparative Example 3 | 3.25:1.25 | 0.18 | 0.08 | 1.022 | 2.556 | 6 | Pass |
| Comparative Example 4 | 3.25:1.25 | 0.18 | 0.08 | 1.444 | 1.467 | 15 | Fail |

*The mixing ratio, content and so on is based on weight ratio.

Referring to the results of Table 3 and Table 4, it can be verified in the result of Example 1 that the difference value of average transmittance was considerably lower compared to the results of Comparative Example 1 and Comparative Example 2 applied with the same inorganic particles. The haze value was considerably lower, too. This is thought to be the result of good dispersion of infrared ray blocking particles due to applying a trioxane-based compound to the film for laminating glass of the present disclosure.

The result of Example 2 including cesium tungsten inorganic particles in a larger amount whose dispersion was more difficult was also remarkably excellent compared to the results of Comparative Example 3 and Comparative While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for laminating glass comprising:
a polyvinyl acetal;
a plasticizer;
inorganic particles; and
a trioxane-based compound,
wherein the inorganic particles and the trioxane-based compound comprised in the film have a weight ratio of inorganic particles to trioxane-based compound of 1:0.005 to 0.8; and
the trioxane-based compound is a dispersion stabilizer.

2. The film for laminating glass of claim 1,
wherein the trioxane-based compound and the plasticizer have a difference in refractive index from each other of 0.1 or less.

3. The film for laminating glass of claim 1,
wherein the trioxane-based compound comprises a 1,3,5-trioxane skeleton, and 1 to 3 carbon atoms within 3 carbon atoms in the skeleton independently have hydrogen, or an alkyl group having 1 to 5 carbon atoms, respectively.

4. The film for laminating glass of claim 1,
wherein the trioxane-based compound is comprised in an amount of 0.0001 to 1 wt % with respect to a total weight of the film for laminating glass.

5. The film for laminating glass of claim 1,
wherein a deviation of visible light transmittance is 1.0 or less.

6. The film for laminating glass of claim 1,
wherein a visible light transmittance is 70% or more.

7. The film for laminating glass of claim 1,
wherein a deviation of solar transmittance is 1.0 or less.

8. The film for laminating glass of claim 1,
wherein a solar transmittance is 50% or more.

9. The film for laminating glass of claim 1,
wherein a haze value is 3.5% or less.

10. A laminated glass comprising a laminate where the film for laminating glass according to claim 1 is disposed between two sheets of glass.

11. A vehicle comprising the laminated glass according to claim 10.

12. The film for laminating glass of claim 1, wherein the trioxane-based compound is substituted with an alkyl group having 1 to 5 carbon atoms.

13. The film for laminating glass of claim 12, wherein the trioxane-based compound is a trialkyl trioxane.

14. A film for laminating glass comprising:
a polyvinyl acetal;
a plasticizer;
inorganic particles; and
a trioxane-based compound,
wherein the inorganic particles and the trioxane-based compound comprised in the film have a weight ratio of inorganic particles to trioxane-based compound of 1:0.005 to 0.8; and
the inorganic particles comprise infrared ray blocking particles.

15. The film for laminating glass of claim 14,
wherein the trioxane-based compound comprises a 1,3,5-trioxane skeleton, and 1 to 3 carbon atoms within 3 carbon atoms in the skeleton independently have hydrogen, or an alkyl group having 1 to 5 carbon atoms, respectively.

16. The film for laminating glass of claim 14,
wherein a difference between values of visible light transmittance and solar transmittance is 10% or more.

17. A film for laminating glass comprising:
a polyvinyl acetal;
a plasticizer;
inorganic particles; and
a trioxane-based compound,
wherein the inorganic particles and the trioxane-based compound comprised in the film have a weight ratio of inorganic particles to trioxane-based compound of 1:0.005 to 0.8; and
a difference between values of visible light transmittance and solar transmittance is 10% or more.

18. The film for laminating glass of claim 17,
wherein the trioxane-based compound comprises a 1,3,5-trioxane skeleton, and 1 to 3 carbon atoms within 3 carbon atoms in the skeleton independently have hydrogen, or an alkyl group having 1 to 5 carbon atoms, respectively.

19. The film for laminating glass of claim 17,
wherein the trioxane-based compound is a dispersion stabilizer.

* * * * *